(12) United States Patent
Waruschewski

(10) Patent No.: US 10,253,697 B2
(45) Date of Patent: Apr. 9, 2019

(54) COOLING DEVICE FOR USE IN A POWER PLANT

(71) Applicant: Siemens Aktiengesellschaft, Munich (DE)

(72) Inventor: Andreas Waruschewski, Bottrop (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/578,905

(22) PCT Filed: Jun. 3, 2016

(86) PCT No.: PCT/EP2016/062583
§ 371 (c)(1),
(2) Date: Dec. 1, 2017

(87) PCT Pub. No.: WO2017/005427
PCT Pub. Date: Jan. 12, 2017

(65) Prior Publication Data
US 2018/0156123 A1    Jun. 7, 2018

(30) Foreign Application Priority Data

Jul. 9, 2015  (DE) .................. 10 2015 212 890

(51) Int. Cl.
*F02C 7/18*      (2006.01)
*F24F 11/00*     (2018.01)
(Continued)

(52) U.S. Cl.
CPC ............ *F02C 7/185* (2013.01); *F24F 11/745* (2018.01); *F24F 11/77* (2018.01); *F24F 11/81* (2018.01)

(58) Field of Classification Search
CPC combination set(s) only.
See application file for complete search history.

(56) References Cited

U.S. PATENT DOCUMENTS 5,230,719 A * 7/1993 Berner ................... F24F 3/1411
                                                                    165/4
5,794,448 A    8/1998 Fujioka et al.
(Continued)

FOREIGN PATENT DOCUMENTS

CN  202532948 U   11/2012
DE  4304336 A1    8/1994
(Continued)

OTHER PUBLICATIONS

Dictionary.com, "heat exchanger", URL https://www.dictionary.com/browse/heat-exchanger, Accessed Sep. 26, 2018.*
(Continued)

*Primary Examiner* — Gregory Huson
*Assistant Examiner* — Elizabeth M May
(74) *Attorney, Agent, or Firm* — Beusse Wolter Sanks & Maire

(57) ABSTRACT

A cooling device for use in a power plant, having at least two controllable fans, which are designed to produce an air flow having a specified flow direction during operation, at least two closing flaps, which close respective flow cross-sections, and a heat exchanger, which thermally interacts with the at least two air flows for heat exchange as a secondary medium, wherein the closing flaps are not operated by a mechanical adjusting device but rather are each to be opened merely by one of the two air flows as a result of the dynamic pressure when a minimum flow rate is reached. Furthermore at least two holding devices are provided, which hold the closing flaps in an open position when the closing flaps are opened.

13 Claims, 1 Drawing Sheet

(51) Int. Cl.
     *F24F 11/74*      (2018.01)
     *F24F 11/77*      (2018.01)
     *F24F 11/81*      (2018.01)

(56) References Cited

U.S. PATENT DOCUMENTS

| | | | |
|---|---|---|---|
| 6,676,508 B1 * | 1/2004 | Graham | F24F 13/1426 454/270 |
| 2006/0179857 A1 | 8/2006 | Weng et al. | |
| 2007/0289327 A1 | 12/2007 | Lessing | |
| 2015/0198342 A1 * | 7/2015 | Merscher | F24F 5/00 165/11.1 |

FOREIGN PATENT DOCUMENTS

| | | |
|---|---|---|
| DE | 10257642 A1 | 7/2004 |
| DE | 10257838 B4 | 7/2004 |
| DE | 102007036475 A1 | 2/2009 |
| EP | 1431698 A2 | 6/2004 |
| WO | 2014092777 A1 | 6/2014 |

OTHER PUBLICATIONS

DE Search Report dated Jan. 26, 2016, for DE patent application No. 102015212890.3.
International Search Report dated Oct. 19, 2016, for PCT/EP2016/062583.

* cited by examiner

COOLING DEVICE FOR USE IN A POWER PLANT

CROSS REFERENCE TO RELATED APPLICATIONS

This application is the US National Stage of International Application No. PCT/EP2016/062583 filed Jun. 3, 2016, and claims the benefit thereof. The International Application claims the benefit of German Application No. DE 102015212890.3 filed Jul. 9, 2015. All of the applications are incorporated by reference herein in their entirety.

FIELD OF INVENTION

The invention relates to a cooling device for use in a power plant.

BACKGROUND OF INVENTION

In a power plant environment, it is often necessary to adjust process flows of a fluid to lower temperatures by means of a cooling device. Particularly in the case of gas turbine applications, such cooling devices are necessary in order to bring bleed air taken from the compressor, for example, to a lower temperature level. The cooled bleed air can be used, in turn, for purging operations or for the thermal insulation of the casing of the gas turbine. However, since relatively large quantities of thermal energy arise in gas turbines, especially in stationary gas turbines, the cooling devices provided must be able to allow effective cooling of the respective process medium.

Typical cooling devices used in a power plant environment have a plurality of controllable fans, which can each produce an air flow with a specified flow direction, wherein, after thermal interaction with a heat exchanger, this air flow can remove heat therefrom as a secondary medium for cooling purposes. If it is necessary to provide a constant temperature in the primary medium to be cooled in the heat exchanger, the fans are typically operated in a constant manner above a certain minimum speed, wherein the flow of the primary medium is likewise set to a constant level.

When a plurality of controllable fans that thermally interact with the same heat exchanger is provided, however, there can be backflows from one fan to another fan, and therefore the controllable fans are generally closed by a closing flap, in particular to the extent that the fans are no longer needed. Closing flaps of this kind are typically opened by the dynamic pressure of an air flow from a fan, wherein, after the specified minimum speed has been reached, the closing flap can be held open by the flow pressure. Normally, each fan is assigned a closing flap of this kind, wherein the closing flaps perform an opening movement in the region of the minimum speed. However, closing flaps of this kind can not only perform a brief uncontrolled movement in the limiting pressure range but can also strike against parts of the casing or of the mounting, and this should be avoided.

As part of increasing the flexibility of power plants, it is furthermore also necessary not to continuously cool process flows of a primary medium over a prolonged period, or to vary the cooling capacity. Thus it may be necessary, for example, also to be able to provide the cooling capacity at intermittent times. To this extent, there are frequent on and off switching operations of the fans, as a result of which high loads are imposed on the fan motors and, as a consequence, the service life of a fan is impaired. Moreover, the differences in the way in which the individual fans are operated result not only in a reduction in service life but also in increased noise pollution as well as largely uncontrolled radiation of heat by the motors of the fans.

In the context of increasing flexibility of power plant operation, it is furthermore found to be necessary not only that it should be possible to operate fans continuously above the specified minimum speed but also that operation below the specified minimum speed should be achieved. However, secure operation of the closing flaps can no longer be achieved in consequence of underspeed operation, and therefore this circumstance too requires frequent on and off switching operations of the fans.

In addition to the already mentioned disadvantages of unfavorable heat generation and also increased noise pollution due to flexible operating behavior, it is found that the temperature of the primary media too can no longer be adjusted to a constant value owing to the operating restrictions imposed by the flaps. On the contrary, the initial temperature of the primary medium emerging from the heat exchanger fluctuates so widely that it can impair operation of the power plant.

SUMMARY OF INVENTION

It is the intention to resolve these disadvantages known from the prior art by means of a technical development in order, in particular, to allow improved, more flexible operation of the cooling devices.

This object underlying the invention is achieved by a cooling device as claimed and by a method for operating such a cooling device as claimed.

In particular, the objects underlying the invention are achieved by a cooling device for use in a power plant, comprising at least two controllable fans, which are each designed to produce an air flow having a specified flow direction during operation. Furthermore comprising at least two closing flaps, which can close respective flow cross-sections, and furthermore comprising a heat exchanger, which can thermally interact at least with the two air flows for heat exchange as a secondary medium, wherein the closing flaps cannot be operated by means of a mechanical adjusting device but rather can each be opened solely by means of one of the two air flows as a result of the dynamic pressure when a minimum flow rate is reached, and wherein furthermore at least two holding devices are provided, which can hold the respective closing flaps in an open position when the closing flaps are opened.

The objects underlying the invention are furthermore achieved by a method for operating a cooling device of this kind as described above and also below, which comprises the following steps: —operating at least one of the at least two fans, with the result that the minimum flow rate (Smin) is reached; —activating the respectively associated holding device to hold the respectively associated closing flap in an open position after or even before the minimum flow rate (Smin) is reached.

According to the invention, therefore, provision is made for the cooling device to have at least two controllable fans, which can be closed by a respectively associated closing flap.

When the closing flap is closed, there can thus be no backflow from a fan which is in operation in the direction of another fan which is not in operation. Depending on the number of fans being operated, the heat exchanger can be operated with a different number of fans for dissipating heat from a primary medium. The closing flaps provided by the cooling device furthermore have no mechanical adjusting device which could achieve selective setting of the cross section exposed by the closing flaps for the respective air flow. The closing flaps are opened solely as a result of the dynamic pressure of the air flow produced by an associated fan, wherein opening is achieved above a minimum flow rate.

Once the closing flap is fully opened owing to the adequate dynamic pressure, a holding device can be activated, either before or after, which, when the closing flap is opened, can hold it in an open position. Subsequently, therefore, the opening of the closing flap is no longer accomplished by means of the dynamic pressure or flow pressure of the air flow but solely by the interaction with the respective holding device. In this way, it is possible to ensure that the fan can be operated without the respectively associated closing flap being closed, even at lower flow rates than the specified minimum flow rate. Consequently, it is also not necessary to start and stop the fans each time in an operating mode according to the prior art since operation at lower air flows can now also be made possible. In other words, the holding device enables the closing flaps to be held open, irrespective of the speed of the respectively associated fan.

Owing to the use of the cooling device with flexibility improved in this way, it is not only possible to set the starting and stopping of each fan more precisely but also to avoid the above-described noise pollution due to the closing flaps interacting with the casing or the mounting on the cooling device. Moreover, the heat exchanger can also be operated in such a flexible way that it is possible to regulate the primary medium to a constant temperature.

A first embodiment of this cooling device according to the invention envisages that the holding device is electrically operated, in particular comprises a switchable electromagnet. A switchable electromagnet of this kind, as well as other electric holding devices, can also easily be provided retrospectively in the context of servicing, wherein the activation and deactivation of the respective holding devices can be achieved centrally, by means of the control system of the power plant for instance. Of course, it is likewise conceivable to provide a dedicated controller. An electric holding device allows the use of a central electric controller.

According to another embodiment of the invention, it is envisaged that a controller is furthermore included, which is connected electrically both to the at least two fans and to the at least two holding devices. Here, the controller can activate and deactivate the at least two holding devices in accordance with the speed of the respective fan or the flow rate of the air flows produced thereby. It is thereby advantageously possible to achieve selective holding open of the respective closing flaps as part of a power-plant control process.

According to a development of this inventive concept, it is envisaged that the controller is designed to activate the holding device when the respectively associated fan has reached a specified first flow rate. Here, the controller can, for instance, use the speed of the associated fan motor as a control parameter, from which, for instance, a direct relationship with the flow rate of the respective fan can be derived. Other control parameters which are suitable for characterizing the respective first air flow rate are, of course, likewise conceivable. If the first flow rate according to the embodiment is reached, it can be assumed that the closing flap is in an open position, and therefore it is possible, by activation, for the respectively associated holding device to continue to hold the closing flap in the existing open position. Even if there is a subsequent reduction in the flow rate, therefore, the closing flap can be held in an open position by the holding device.

According to another embodiment, which can also be regarded as a development, it is envisaged that the controller is designed to deactivate the holding device when the respectively associated fan has reached a specified second flow rate, in particular when the respectively associated fan is not delivering an air flow. Here, the second flow rate is normally lower than the first flow rate since deactivation of the respective fan in normal operation should take place only if a first flow rate for the activation of the holding device, for instance, has already been reached. In other words, the controller is also designed to initiate deactivation if the air flow rate decreases while the closing flap is open if the air flow produced does not make any significant contribution to the cooling of the primary medium by means of the heat exchanger, for example. This is the case particularly when the fan itself is no longer delivering an air flow.

According to another embodiment of the invention, it is envisaged that the controller is designed to detect an electric current fed to the holding device in order to be able to determine whether the holding device is open or closed. By detection of the current, it is thus possible for the controller to obtain information as to the state of the holding device. This can be particularly advantageous when eliminating faults, for example.

According to another embodiment of the invention, it is envisaged that the at least two controllable fans, the at least two closing flaps, the heat exchanger and the at least two holding devices are arranged together in a casing. Such an arrangement allows easy modular handling of the cooling device, for instance, as well as clear setting of the respective flow conditions in the casing. In particular, the interaction between the air flows produced by the respective fans takes place at a point in time at which there has as yet been no contact with the external environment. The casing thus allows particularly efficient cooling operation.

According to another advantageous embodiment of the cooling device according to the invention, it is envisaged that the at least two closing flaps can be closed gravitationally by their own weight. Thus, for example, the closing flaps can be held at the end on one side by a folding hinge, wherein the surface of the closing flap can close the flow cross section associated with one fan.

According to a likewise embodiment of the invention, it is envisaged that the specified flow directions of at least some of the fans, advantageously of all the fans, furthermore strike the surface of the heat exchanger perpendicularly. By virtue of this geometrical arrangement, particularly favorable heat dissipation at the heat exchanger can be accomplished since efficient turbulent heat dissipation can be made possible by the powerful swirling of the impinging air flows.

According to a first advantageous embodiment of the method according to the invention, it is envisaged that the following steps are furthermore included: —reducing the flow rate of the at least one fan below a specified second flow rate after holding the closing flap; —deactivating the respectively associated holding device to close the respectively associated closing flap after the second flow rate has been reached.

The invention will be described more specifically in detail below with reference to individual figures. Here, it should be noted that the figures are to be taken as merely schematic and that a lack of feasibility of the invention cannot be inferred therefrom.

It should furthermore be noted that the intention is to claim the technical features described below in any combination to the extent that this combination can achieve resolution of the object according to the invention.

It should furthermore be noted that the technical features provided with the same reference signs have the same technical effects.

BRIEF DESCRIPTION OF THE DRAWINGS

Here.

DETAILED DESCRIPTION OF INVENTION

Figure 1:
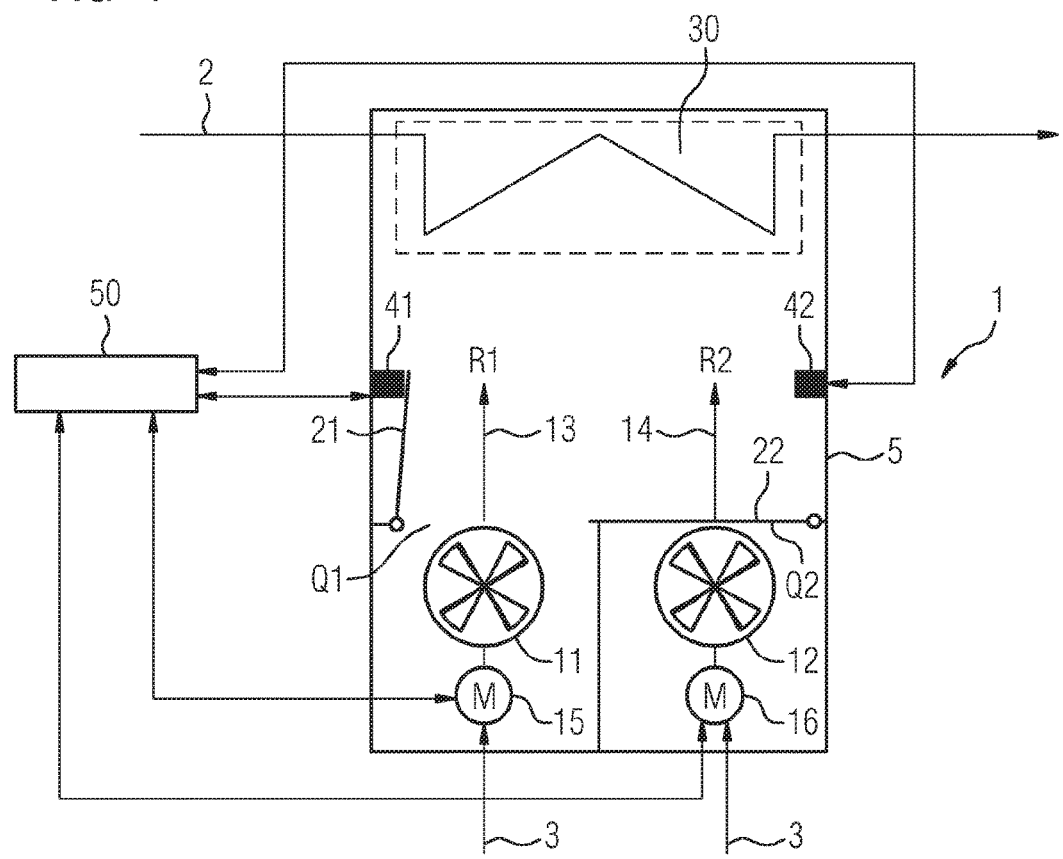
FIG. 1 shows a first schematic embodiment of the cooling device according to the invention in a circuit diagram.

FIG. 1 shows an embodiment of the invention in a schematic circuit diagram. Within a casing 5, the cooling device 1 shown has a heat exchanger 30, which can be brought into thermal interaction with two fans 11, 12 for heat dissipation. In addition to a rotary unit (not provided with a separate reference sign), which produces an air flow, the fans 11, 12 have a fan motor 15, 16, which powers the rotary unit. The fans 11, 12 are designed to draw in air as a secondary medium 3 and to concentrate it into an air flow 13, 14, which impinges upon the heat exchanger 30. The respective air flows 13, 14 interact thermally with the heat exchanger 30 in such a way that the secondary medium 3 can be used to cool the primary medium 2, which is passed through the heat exchanger 30.

The fans 11, 12 can be decoupled fluidically from the heat exchanger 30 by respective closing flaps 21, 22, wherein the closing flaps 21, 22 are primarily provided for the purpose of avoiding backflow from one fan 11, 12 to the other fan 11, 12 in each case. The closing flaps 21, 22 are typically mounted on the casing at the end in such a way that they can be tilted by means of a hinge, with the result that, during operation of the respective fan 11, 12, the respective closing flap 21, 22 can be opened by the dynamic pressure after a minimum flow rate Smin has been reached, after which the air flow 13, 14 can pass through the respective flow cross section Q1, Q2 and can be directed to the heat exchanger 30 in a respective flow direction R1, R2. Depending on the flow rate 13, 14, a higher or lower cooling capacity can be achieved at the heat exchanger 30.

If the cooling device 1 is now to be used in a flexible power plant environment, it may also be necessary for the fans 11, 12 to be operated at a speed such that the minimum flow rate for opening the respective closing flaps 21, 22 is not or should not be reached. In order to nevertheless open the closing flaps 21, 22, the respective fan 11, 12 can be operated in such a way that the minimum flow rate Smin is temporarily reached or exceeded, wherein, following this, a respective holding device 41, 42 associated with the fan 11, 12 can be activated in order to hold the respective closing flap 21, 22 in the open position. The flow rate of the respective air flow 13, 14 can then be reduced again, thus allowing the respective fans 11, 12 also to be used flexibly below the minimum flow rate Smin.

The holding devices 41, 42 are typically electrically operated and can comprise either an electromagnet or some other electrically activated and operated holding mechanism. The holding devices 41, 42 are furthermore electrically connected to a controller 50, which are likewise coupled to the respective motors 15, 16 of the fans 11, 12. If the holding device 41, 42 is designed as an electromagnet, for instance, detection of the supply current by means of the controller 50 can be used to discover whether the closing flap 21, 22 is in an open position or a closed position. When a specified speed is reached, which is designed, for instance, to produce the minimum flow rate Smin of the respective fan 11, 12, it is furthermore possible for the respective holding device 41, 42 to be activated in order to hold the closing flaps 21, 22 in the open position. Once the open position is established, it is likewise possible for the holding device 41, 42 to be deactivated again if, for instance, the flow rate of the individual air flows 13, 14 falls below a second limit value. By this means, it is possible to ensure that backflow of the air into one fan 11, 12 from the other fan 11, 12 can be avoided, especially when there is a very low flow rate.

Figure 2:
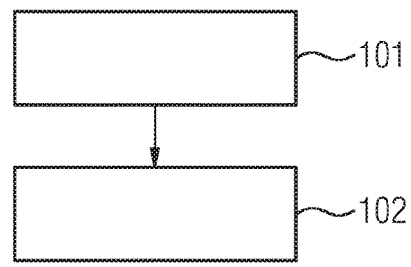
FIG. 2 shows an illustration in the form of a flow diagram of an embodiment of the method according to the invention.

FIG. 2 shows an illustration in the form of a flow diagram of an embodiment of the method according to the invention for operating an above-described cooling device 1, which comprises the following steps: —operating at least one of the at least two fans 11, 12, with the result that the minimum flow rate (Smin) is reached; (first method step 101)— activating the respectively associated holding device 41, 42 to hold the respectively associated closing flap 21, 22 in an open position after the minimum flow rate (Smin) is reached. (second method step 101)

Further embodiments can be found in the dependent claims.

The invention claimed is:

1. A cooling device for use in a power plant, comprising:
at least two controllable fans, each of which is designed to produce a respective air flow of at least two air flows, each air flow of the at least two air flows comprising a specified flow direction during operation,
at least two closing flaps which close respective flow cross-sections, and a heat exchanger which thermally interacts with the at least two air flows,
wherein the at least two closing flaps cannot be operated by a mechanical adjusting device but rather each closing flap of the at least two closing flaps is configured to be opened solely by a respective air flow of the at least two air flows as a result of a dynamic pressure generated when a minimum flow rate in the respective air flow is reached, and
at least two holding devices which hold the respective closing flaps in an open position when the closing flaps are opened, and
a controller, which is connected electrically both to the at least two controllable fans and to the at least two holding devices, wherein the controller is designed to activate a respective holding device of the at least two holding devices when a respectively associated fan of the at least two controllable fans has reached a specified first flow rate.

2. The cooling device as claimed in claim 1, wherein the at least two holding devices are electrically operated.

3. The cooling device as claimed in claim 1, wherein the controller is designed to deactivate the respective holding device of the at least two holding devices when the respectively associated fan of the at least two controllable fans has reached a specified second flow rate.

4. The cooling device as claimed in claim 1, wherein the controller is designed to detect an electric current fed to the at least two holding devices in order to be able to determine whether at least one holding device of the at least two holding devices is open or closed.

5. The cooling device as claimed in claim 1,
wherein the at least two controllable fans, the at least two closing flaps, the heat exchanger and the at least two holding devices are arranged in a casing.

6. The cooling device as claimed in claim 1,
wherein the at least two closing flaps are closed gravitationally by their own weight.

7. The cooling device as claimed in claim 1,
wherein specified flow directions of at least some fans of the at least two controllable fans furthermore strike a surface of the heat exchanger perpendicularly.

8. A method for operating a cooling device as claimed in claim 1, the method comprises the following steps:
operating at least one fan of the at least two controllable fans, with the result that the minimum flow rate of the at least one fan is reached; and
activating a respectively associated holding device of the at least two holding devices to hold a respectively associated closing flap of the at least two closing flaps in the open position after the minimum flow rate of the at least one fan is reached.

9. The method as claimed in claim 8, further comprising:
reducing a flow rate of the at least one fan below a specified second flow rate after holding the respectively associated closing flap in the open position; and
deactivating the respectively associated holding device to close the respectively associated closing flap after the specified second flow rate has been reached.

10. The cooling device as claimed in claim 2, wherein the at least two holding devices comprise a switchable electromagnet.

11. The cooling device as claimed in claim 3, wherein the controller is designed to deactivate the respective holding device when the respectively associated fan is not delivering the respective air flow.

12. The cooling device as claimed in claim 7, wherein specified flow directions of all fans of the at least two fans strike the surface of the heat exchanger perpendicularly.

13. A cooling device, comprising:
a plurality of cooling fan arrangements, each cooling fan arrangement of the plurality of cooling fan arrangements comprising: a fan configured to generate an air flow; a closing flap configured to block the air flow when closed and pass the air flow when open; and a holding device configured to hold the closing flap open;
a heat exchanger, wherein in each cooling fan arrangement the air flow thermally interacts with the heat exchanger if the closing flap is open; and
a controller, wherein in each cooling fan arrangement the holding device is controlled by the controller;
wherein in each cooling fan arrangement the closing flap is opened solely by a dynamic pressure generated once a minimum flow rate is reached in the air flow; and
wherein for each cooling fan arrangement after the minimum flow rate is reached the controller is configured to activate the holding device to hold the closing flap open until the minimum flow rate drops below a threshold flow rate that is below the minimum flow rate.

* * * * *